United States Patent
Tsunoda et al.

(10) Patent No.: US 11,511,949 B2
(45) Date of Patent: Nov. 29, 2022

(54) MOVABLE OBJECT HOLDING SYSTEM

(71) Applicant: Konica Minolta, Inc., Tokyo (JP)

(72) Inventors: Akira Tsunoda, Yokohama (JP); Shinichi Kawabata, Hino (JP); Yuki Higuchi, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/245,552

(22) Filed: Apr. 30, 2021

(65) Prior Publication Data

US 2021/0362960 A1 Nov. 25, 2021

(30) Foreign Application Priority Data

May 22, 2020 (JP) .............................. JP2020-089922

(51) Int. Cl.
*B25J 15/00* (2006.01)
*B65G 47/90* (2006.01)
*B25J 9/16* (2006.01)
*B25J 15/08* (2006.01)
*B25J 15/02* (2006.01)

(52) U.S. Cl.
CPC .......... *B65G 47/90* (2013.01); *B25J 15/0033* (2013.01); *B25J 9/1697* (2013.01); *B25J 15/0028* (2013.01); *B25J 15/0038* (2013.01); *B25J 15/0253* (2013.01); *B25J 15/08* (2013.01)

(58) Field of Classification Search
CPC .... B25J 15/0033; B25J 15/0038; B65G 47/90
USPC .................................................. 269/257–284
See application file for complete search history.

(56) References Cited

U.S. PATENT DOCUMENTS

2017/0282363 A1* 10/2017 Yamada ............... B25J 15/0071
2019/0126491 A1* 5/2019 Harkleroad ............ B25J 13/082
2020/0288913 A1* 9/2020 Pan ........................ A47J 43/042

FOREIGN PATENT DOCUMENTS

JP 2018-043331 A 3/2018

* cited by examiner

*Primary Examiner* — Ronald P Jarrett
(74) *Attorney, Agent, or Firm* — Lucas & Mercanti, LLP

(57) ABSTRACT

A movable object holding system for holding a movable object including a body portion 11 and a protruding portion protruding from the body portion, comprising a hand part 40 holding a movable object, the hand part 40 comprising plural guide portions limiting movement of the movable object in a first axis direction and a second axis direction that are perpendicular to each other and a pair of positioning portions 43e limiting movement of the movable object in a third axis direction that is perpendicular to the first and second axis directions, wherein the hand part 40 holds the movable object with the protruding portion of the movable object disposed in a space surrounded by the plural guide portions and touching the pair of the positioning portions 43e and with a part of the body portion of the movable object exposed out of the hand part 40.

17 Claims, 12 Drawing Sheets

MOVABLE OBJECT HOLDING SYSTEM

CROSS REFERENCE TO RELATED APPLICATIONS

This application claims the foreign priority benefit under 35 U.S.C. § 119 of Japanese Patent Application No. 2020-089922 filed on May 22, 2020, the disclosure of which is incorporated herein by reference.

TECHNICAL FIELD

The present invention relates to a technology to hold a movable object.

BACKGROUND

JP2018-043331A describes a technology to grip an object to be gripped with plural finger bodies of a robot hand.

Since an orientation of the object to be gripped is not kept constant, the technology described in JP2018-043331A has a problem that the orientation of the object to be gripped has to be changed when the object to be gripped is placed, which makes control of the robot hand and a robot arm rather complicated.

The present invention has been created to work out the problem as described above and has an objective to provide a movable object holding system with a relatively simple configuration that enables holding a movable object in a predetermined orientation.

SUMMARY

In order to achieve the objective above mentioned, the present invention has the following configurations.

1. A movable object holding system for holding a movable object including a body portion and a protruding portion protruding from the body portion, comprising a hand part holding the movable object, the hand part comprising, plural guide portions limiting movement of the movable object in a first axis direction and a second axis direction that are perpendicular to each other, and a pair of positioning portions limiting movement of the movable object in a third axis direction that is perpendicular to the first and second axis directions, wherein the hand part holds the movable object with the protruding portion of the movable object disposed in a space surrounded by the plural guide portions and touching the pair of the positioning portions and with a part of the body portion of the movable object exposed out of the hand part.

2. The movable object holding system according to the first configuration, wherein the hand part puts the movable object held by the hand part on a storage plate.

3. The movable object holding system according to the first configuration, wherein the plural guide portions include a pair of guiding portions that guides the protruding portion of the movable object into the space surrounded by the plural guide portions when the hand part is holding the movable object.

4. The movable object holding system according to the first configuration, wherein the plural guide portions are arranged in the third axis direction to be oriented substantially in parallel with a longitudinal direction of the movable object when the movable object is being held.

5. The movable object holding system according to the fourth configuration, wherein the pair of the positioning portions extends perpendicularly to a direction in which the plural guide portions are arranged.

6. The movable object holding system according to the first configuration, wherein each of the hand part comprises a hand base part and a movable object holding part including the plural guide portions and the pair of the positioning portions, wherein the movable object holding part is attached to the hand base part in such a way that the movable object holding part is capable of revolving about the hand base part.

7. The movable object holding system according to the sixth configuration, wherein the movable object is made to touch the pair of the positioning portions by applying to the movable object a gravity force or a centrifugal force generated by revolving the movable object holding part.

8. The movable object holding system according to the first configuration, wherein the hand part further comprising an external force applying part to apply an external force to the protruding portion of the movable object being held by the hand part so that the protruding portion touches the pair of the positioning portions.

9. The movable object holding system according to the fourth configuration, wherein a gap formed between inner circumferential faces of the plural guide portions when the movable object is held is the smallest between a pair of the guide portions that are located at a position from which the body portion of the movable object is exposed.

10. The movable object holding system according to the first configuration, wherein the movable object that is being held is kept apart from the plural guide portions.

11. The movable object holding system according to the first configuration, wherein the plural guide portions include bearing members that are capable of rotating when the movable object 10 touches the bearing members.

12. The movable object holding system according to the first configuration, further comprising a recognizing section recognizing the movable object and an arm part connected with the hand part.

13. The movable object holding system according to the twelfth configuration, wherein the protruding portion of the movable object that is being held by the hand part is made to touch the pair of the positioning portions by applying a centrifugal force generated by an operation of the arm part.

14. The movable object holding system according to the twelfth configuration, wherein if the protruding portion of the movable object that is being held does not touch the pair of the positioning portions, the hand part performs an operation to slightly release the movable object being held to make the protruding portions touch the pair of the positioning portions.

15. The movable object holding system according to the twelfth configuration, wherein the recognizing section determines whether the movable object includes the protruding portion or not, and wherein if the recognizing section determines that the movable object includes the protruding portion, the hand part holds the movable object with the protruding portion being kept in a space surrounded by the guide portions and touching the pair of the positioning portions and with a part of the body portion exposed out of the hand part.

16. The movable object holding system according to the twelfth configuration, wherein the hand part changes the position of the pair of the positioning portions according to a shape of the movable object recognized by the recognizing section to hold the movable object.

The present invention enables holding a movable object in a predetermined state with a relatively simple configuration.

DETAILED DESCRIPTION OF EMBODIMENTS

Hereinafter, an embodiment of the present invention is described with several examples to hold a movable object such as a bolt made of a metal, which includes a body portion in a columnar shape and a protruding portion in a circular shape with appropriate reference to drawings. Identical elements are given an identical sign and an explanation on the identical elements is not repeated.

Figure 1:
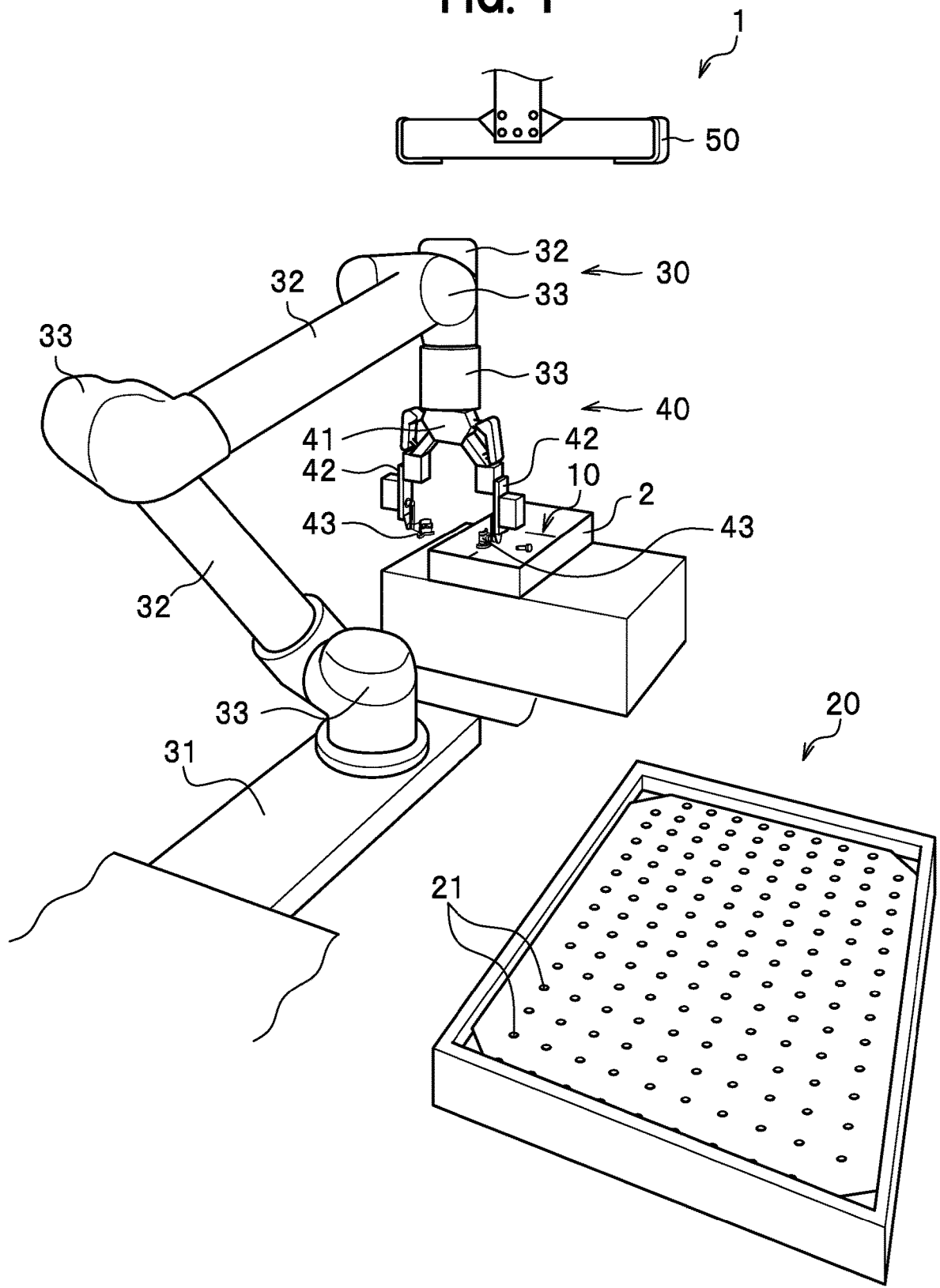
FIG. 1 shows schematically a perspective view of a movable object holding system of an embodiment of the present invention.
Figure 2:
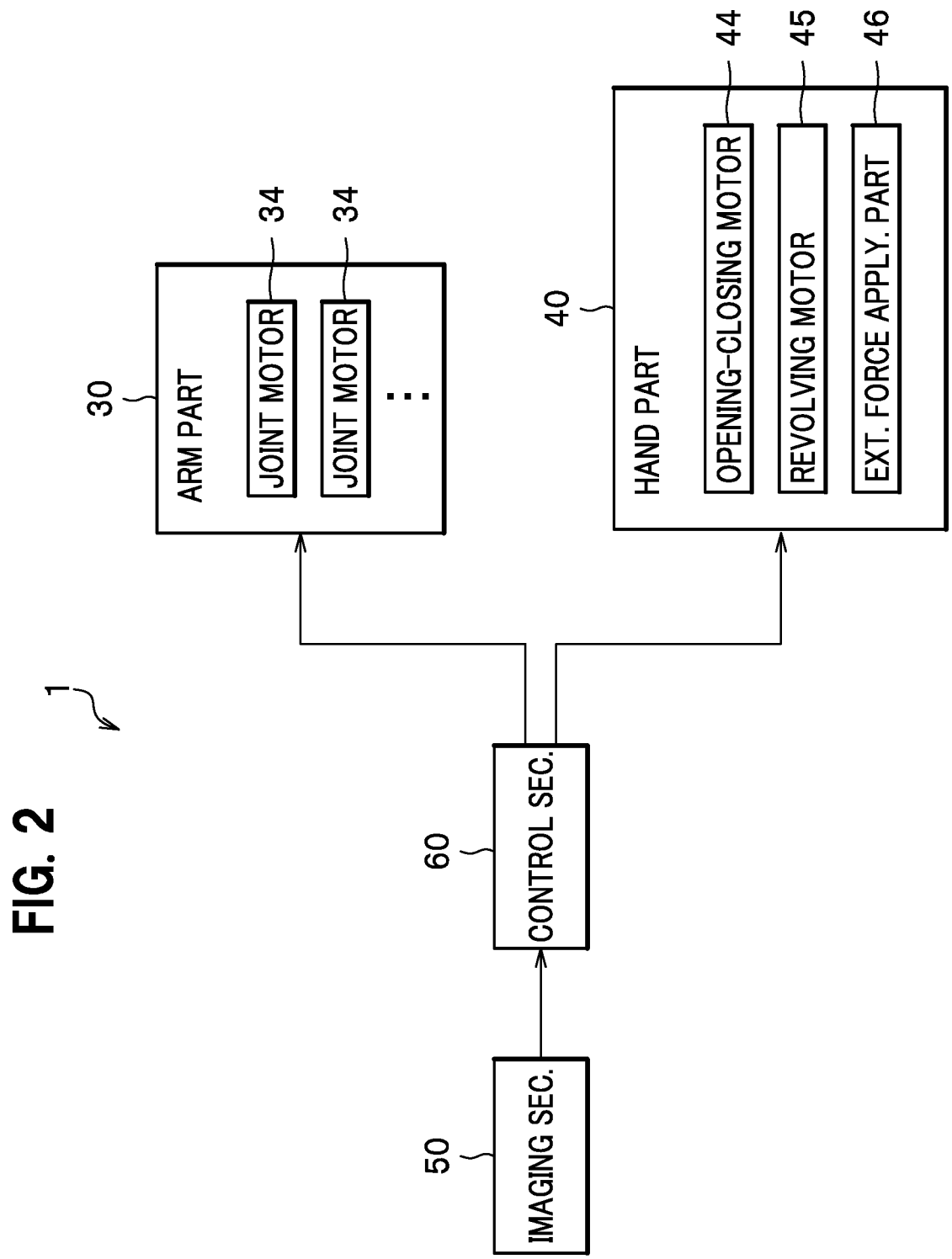
FIG. 2 shows schematically a block diagram of the embodiment.

As shown in FIG. 1 and FIG. 2, a movable object holding system 1 of an embodiment of the present invention is a system to hold a movable object 10 placed on a movable object placing table 2, transfer the movable object 10 while holding it and put the movable object 10 into a hole portion 21 in a storage plate 20. As shown in FIG. 2, the storage plate 20 has plural hole portions 21 formed thereon into which the movable objects 10 are to be inserted.

<Part>

Figure 3:
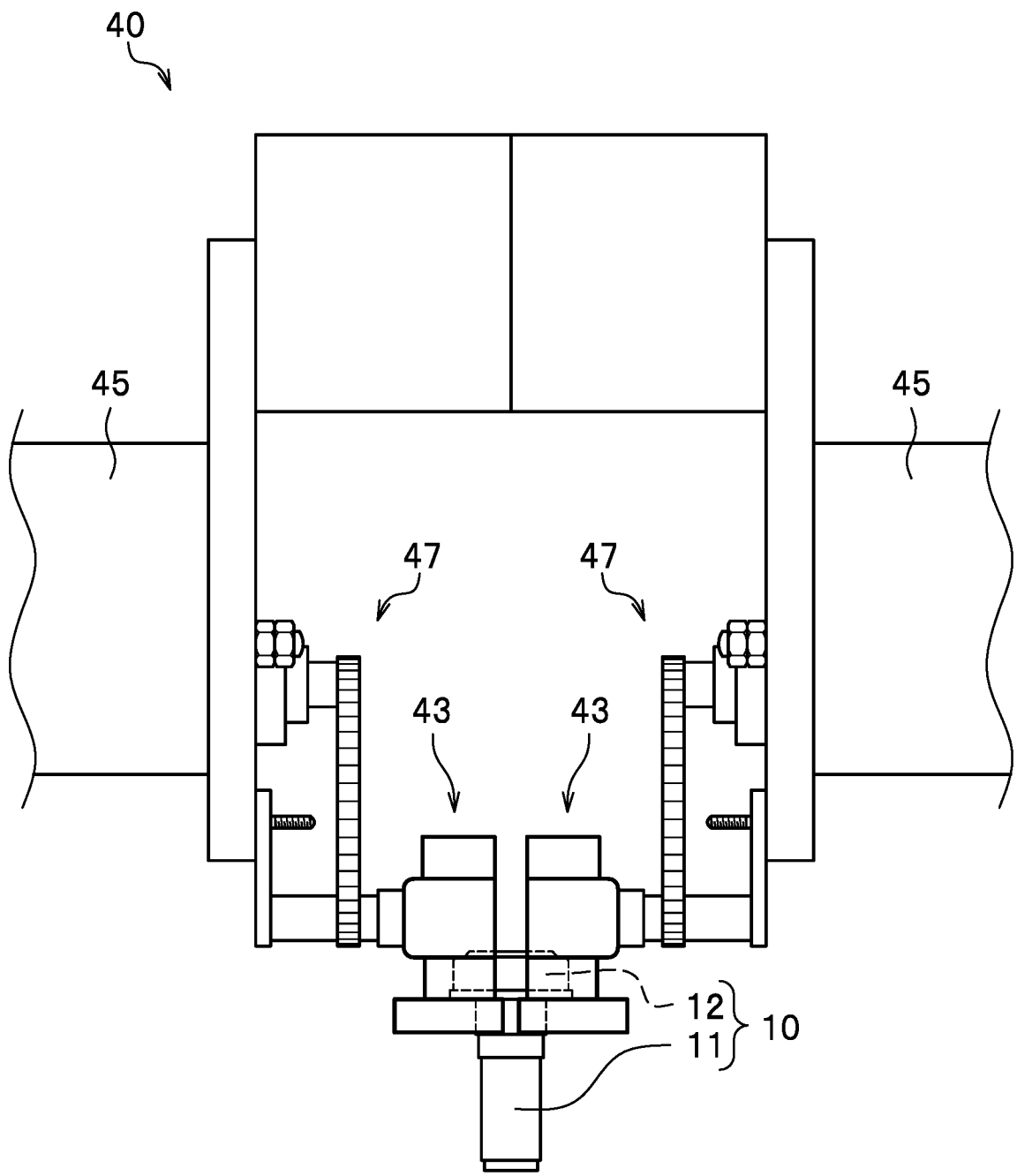
FIG. 3 shows schematically a front elevation view of the embodiment.

As shown in FIG. 3, the movable object 10 includes a body portion 11 in a columnar shape and a protruding portion 12 that is in a circular shape and integrally formed with the body portion 11 and protrudes outward in a radius direction from an outer circumferential face of an end portion of the body portion 11. That is, the protruding portion 12 extends along a plane (in parallel with an axis $A_1$ extending along a left-right direction in FIG. 3 and an axis $A_2$ that is perpendicular to a sheet of paper on which FIG. 3 is drawn) that is perpendicular to an axis direction of the body portion 11 (axis $A_3$ extending in an up-down direction in FIG. 3). Distinction between the body portion 11 and the protruding portion 12 that are of the movable object 10 is used to explain each of the portions of the movable object 10 distinctively when the movable object 10 is being held, transferred, and placed by the movable object holding system 1, and does not mean to define a function or a performance of the movable object 10.

<Movable Object Holding System>

As shown in FIG. 1, the movable object holding system 1 includes an arm part 30, a hand part 40, an imaging section 50 and a control section 60 (See FIG. 2).

<Arm Portion>

The arm part 30 is configured to change a position and a state of the hand part in three dimensions. The arm part 30 includes a base part 31 placed on a floor face, plural links 32 that are connected with the base part 31 and connected in series with each other from the base part 31 and, plural joint parts 33 each of which is installed at a position where two adjacent links 32 are connected, and plural joint motors 34 (See FIG. 2) to drive the joint parts 33.

<Hand Part>

The hand part 40 is connected with a distal end portion of the arm part 30 through a joint part 33. The hand part 40 includes a hand base part 41, a pair of finger parts 42, and a pair of movable object holding part 43.

<Hand Base Portion and Finger Portion>

The hand base part 41 is connected with the distal end portion of the arm part 30 through the joint part 33.

A pair of the finger parts 42 is connected with the hand base part 41 so that the pair of the finger parts 42 can open and close relative to the hand base part 41.

<Movable Object Holding Part>

Figure 4A:
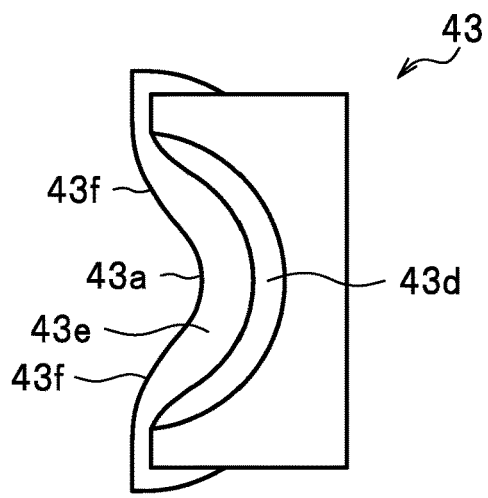
FIG. 4A shows schematically shows a plan view of a movable object holding part.
Figure 4B:
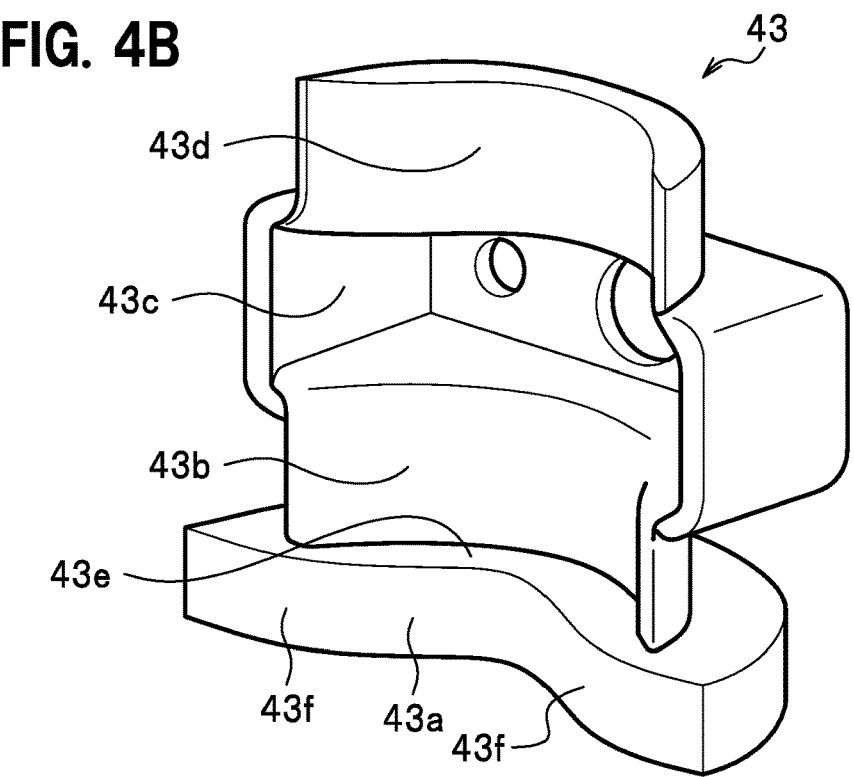
FIG. 4B shows schematically shows a perspective view of the movable object holding part.
Figure 4C:
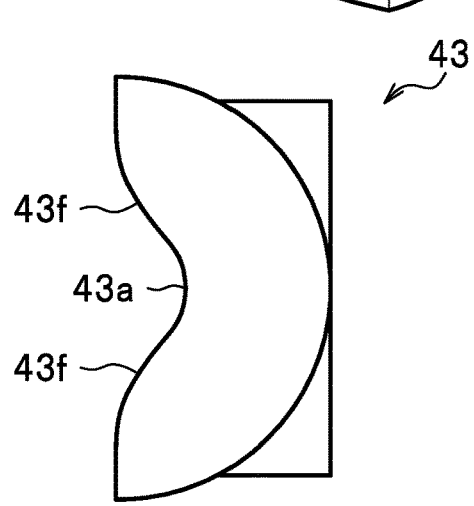
FIG. 4C shows schematically a bottom view of the movable object holding part.

The pair of movable object holding parts 43 are connected respectively with the pair of the finger parts 42 so that each of the pair of the movable object holding parts 43 can revolve about the finger part 42 with which it is connected. As shown in FIG. 4, each of the pair of the movable object holding parts 43 is a resin-made member substantially in a half-cut cylinder shape and is formed by a small diameter portion 43a, a first medium diameter portion 43b, a large diameter portion 43c, and a second medium diameter portion 43d, which are formed in this order from a bottom of the movable object holding part 43. The small diameter portion 43a and the first medium diameter portion 43b are joined to each other at a positioning portion 43e that extends in a radius direction of the movable object holding part 43. When a movable object is held by the pair of the movable object holding parts 43, a gap between inner circumferential faces of a pair of the small diameter portions 43a is smaller than any of a gap between inner circumferential faces of a pair of the first medium diameter portions 43b and a gap between inner circumferential faces of a pair of the second diameter portions 43c.

The inner circumferential faces of the pair of the small diameter portion 43a, the inner circumferential faces of the pair of the first medium diameter portion 43b, and the inner circumferential faces of the pair of the second medium diameter portion 43d are formed in parallel with an axis direction of the movable object 10 that is being held by the pair of the movable object holding parts 43 (that is, an axis direction (axis A3) of the body portion 11 of the movable object 10 that is being held). In addition, the positioning portion 43e is formed perpendicular to the inner circumferential faces of the small diameter portion 43a and the first medium diameter portion 43b.

<Small Diameter Portion (Guide Portion)>

The pair of the small diameter portions 43a are a guide portion to limit movement of the movable object 10 in a planar direction (directions of the axes $A_1$, $A_2$) that is perpendicular to the axis direction of the movable object 10 when the movable object 10 is being held. A guiding portion 43f is formed to extend from each of end portions of the small diameter portion 43a.

The guiding portion 43f has an inner face formed to extend from an outer face of the movable object holding part 43 to an inner face of the small diameter portion 43a, and the inner face of the guiding portion 43f curves at a joint portion to the small diameter portion 43a in an opposite direction to a direction in which the inner face of the small diameter portion 43a curves.

<First Medium Diameter Portion (Guide Portion) and Second Medium Diameter Portion (Guide Portion)>

Each of the pair of the first medium diameter portion 43b and the pair of the second medium diameter portion 43d is a guide portion to limit movement of the movable object 10 in the plane direction (directions of the axes $A_1$, $A_2$) that is perpendicular to the axis direction of the movable object 10 when the movable object 10 is being held.

The positioning portion 43e is configured to be touched by the protruding portion 12 of the movable object 10 when the movable object 10 is being held and limit movement of the movable object 10 in the axis direction of the movable object 10 (one axis direction).

<Other Configuration of Hand Part>

As shown in FIG. 2, the hand part 40 includes an opening-closing motor 44 to open and close a pair of the finger parts 42 and a pair of revolving motors 45 to revolve the pair of the movable object holding parts 43. In addition, the hand part 40 further includes an external force applying portion 46 and a pair of transmitting portions 47 to respectively transmit outputs of the revolving motors 45 (See FIG. 3). The transmitting portion 47 is connected to the large diameter portion 43c of the movable object holding part 43.

<External Force Applying Part>

The external force applying part 46 is configured to apply an external force to the movable object 10 being held by the pair of the movable object holding parts 43 to make the protruding portion 12 of the movable object 10 touch a pair of the positioning portions 43e. The external force applying part 46 can press the movable object 10, for example, from inside the pair of the movable object holding parts 43 to make the protruding portion 12 touch the pair of the positioning portions 43e. In addition, the external force applying portion 46 can, for example, can suck the movable object 10 from outside the pair of the movable object holding parts 43 so that the protruding portion 12 of the movable object 10 touches the pair of the positioning portions 43e. In addition, the external force applying portion 46 can, for example, move the movable object 10 with a magnet force generated by a permanent magnet or an electro-magnet disposed outside the pair of the movable object holding parts 43 so that the protruding portion 12 of the movable object 10 is made to touch the pair of the positioning portions 43e. In addition, the external force applying portion 46 can, for example, vibrate the pair of the movable object holding parts 43 to release the movable object 10 from the pair of the movable object holding parts 43 on which the movable object 10 is stuck so that the protruding portion 12 of the movable object 10 touches the pair of the positioning portions 43e.

<Imaging Section>

The imaging section 50 is configured to take an image of the movable object 10 placed on the movable object placing table 2 and output the image that is taken to the control section 60. In addition, the imaging section 50 takes an image of the movable object 10 being held by the hand part 40 and outputs the image that is taken to the control section 60.

<Control Section>

The control section 60 includes a CPU (Central Processing Unit), a ROM (Read-Only Memory), a RAM (Random Access Memory), an input-output circuit and so on. The control section 60 is configured to recognize the movable object 10 based on the image taken of the movable object 10 by the imaging section 50. That is, a combination of the control section 60 and the imaging section 50 is one example of a recognizing section to recognize the movable object 10. In addition, the control section 60 is configured to control the joint motors 34 of the arm part 30, and the opening-closing motor 44, the pair of the revolving motors 45, and the external force applying part 46 that are of the hand part 40, based on the image of the movable object 10 from the imaging section 50. Thus, the control section 60 can have the hand part 40 hold the movable object 10 and put the movable object 10 into the hole portion 21 of the storage plate 20.

OPERATION EXAMPLES

Next, examples of operation by the movable object holding system 1 are described. In each of the operation examples, the pair of the movable object holding parts 43 is kept with the pair of the small diameter portion 43a at a lower position when the movable object holding system 1 is in the default condition.

First Operation Example

Movable Object in an Upright State with Protruding Portion at an Upper Position

Figure 5A:
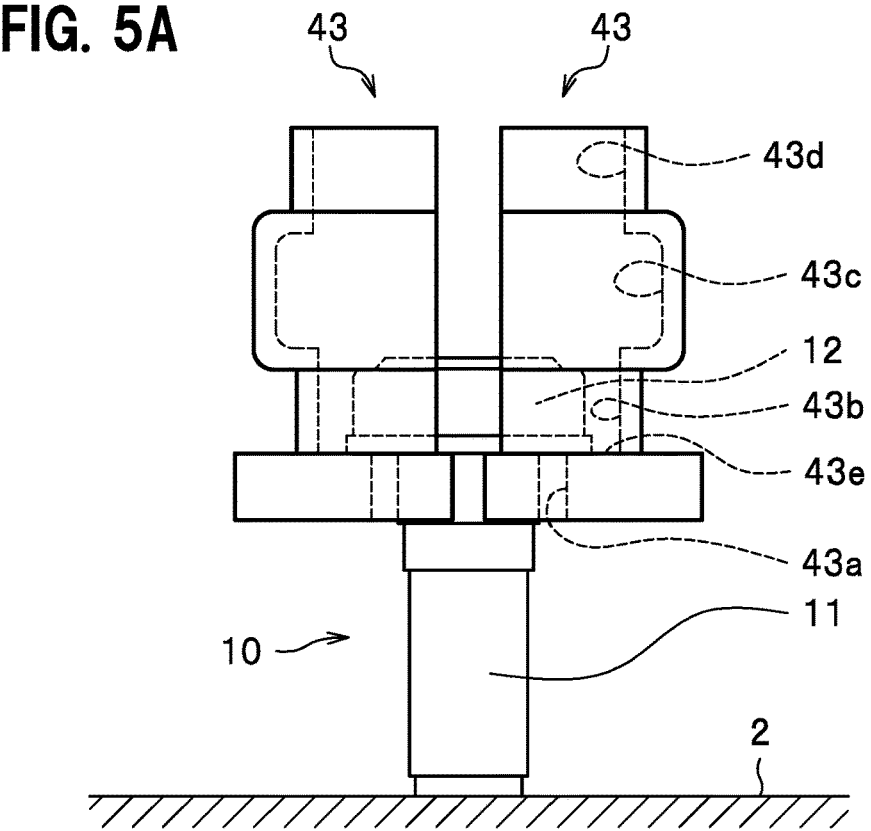
FIG. 5A illustrates schematically a first operation example of holding a movable object with the movable object holding system of the embodiment.

If the movable object 10 is placed on the movable object placing table 2, being in an upright state with the protruding portion 12 at an upper position, as shown in FIG. 5A, the control section 60 recognizes a state of the movable object 10 based on the image taken of the movable object 10 by the imaging section 50. Then, the control section 60 controls the joint motors 34 to move the hand part 40 over to such a position close to the movable object 10 that the pair of the movable object holding parts 43 is positioned respectively on both sides of the movable object 10 with the pair of the small diameter portion 43a below the protruding portion 12.

Then, the control section 60 controls the opening-closing motor 44 so that the pair of the finger parts 42 closes. In this case, the pair of the movable object holding parts 43 can hold the movable object 10 by the pair of the positioning portions 43e touching to support the protruding portion 12 when the movable object 10 is lifted up. When the movable object 10 is held as described above, the protruding portion 12 is housed in a space formed by the pair of the movable object holding parts 43 while a part of the body portion 11 is exposed downward out of the space formed by the pair of the movable object holding parts 43. According to this embodiment, the protruding portion 12 is in face-contact with each of the pair of the positioning portions 43e. However, the protruding portion 12 may be in point-contact with each of the pair of the positioning portions 43e at at least one point and in point-contact with a pair of the protruding portion 12 at more than two points.

Figure 5B:
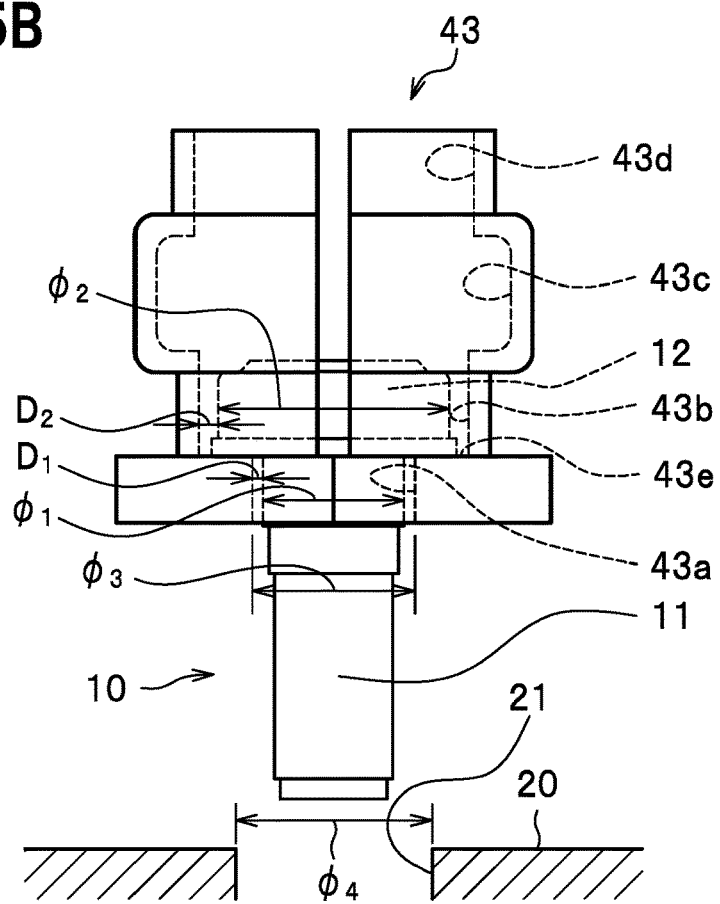
FIG. 5B illustrates schematically the first operation example of holding a movable object with the movable object holding system of the embodiment.

Then, the control section 60 controls the joint motors 34 so that the movable object 10 that is being held is moved from the movable object placing table 2 to a position over a hole portion 21 of the storage plate 20, as shown in FIG. 5B.

Then, the control section 60 controls the opening-closing motor 44 so that the pair of the finger parts 42 opens with a tip portion of the body portion 11 inserted in the hole portion 21. As a result, the movable object 10 is stored on the storage plate 20 with the body portion 11 inserted in the hole portion 21 and with the protruding portion 12 touching a circumferential edge of an opening portion of the hole portion 21.

<Size of Each Portion: Part 10 in an Upright State with Protruding Portion at a Lower Position>

For this embodiment, it is preferable that a diameter $\varphi_1$ of the body portion 11 (width direction size), a diameter $\varphi_2$ of the protruding portion 12, a diameter $\varphi_3$ of the pair of the small diameter portion 43a in a closed state and a diameter $\varphi_4$ of the hole portion 21 of the storage plate 20 satisfy the following inequality relation.

$$\varphi_1 \leq \varphi_3 \leq \varphi_4 \leq \varphi_2$$

With this inequality met, even if the movable object 10 being held by the pair of the movable object holding parts 43 is misaligned in the direction of the axis $A_1$ or $A_2$, the body portion 11 of the movable object 10 can be inserted into the hole portion 21.

In addition, it is preferable that a gap $D_1$ between the body portion 11 and the small diameter portion 43a in the closed state (summation of gaps in a direction perpendicular to the axis $A_3$) and a gap D2 between the protruding portion 12 and the first medium diameter portion 43b in the closed state (summation of gaps in a direction perpendicular to the axis $A_3$) satisfy the following inequality relation. It is noted that a sign is given to only one of each pair of the gaps D1 and the gaps D2 which are formed respectively on both sides of the axis of the movable object 10.

$$D_1 \leq D_2, \text{ where } D_1 = \varphi_3 - \varphi_2$$

With this inequality relation met, even if the movable object 10 being held by the pair of the movable object holding parts 43 is misaligned in the direction of the axis $A_1$ or $A_2$, it is prevented that the protruding portion 12 of the movable object 10 comes in contact with the first medium diameter portion 43b so that the upright state of the movable object 10 breaks.

That is, when the movable object 10 is being held, the small diameter portion 43a, the first medium diameter portion 43b and the second medium diameter portion 43d respectively function as guide portions, and it is preferable that both the first medium diameter portion 43b and the second medium diameter portion 43d are kept apart from the movable object 10 (the protruding portion 12) if the small diameter portion 43a touches the movable object 10 (the body portion 11).

In addition, it is more preferable that all of the small diameter portion 43a, the first medium diameter portion 43b and the second medium diameter portion 43d are kept apart from the movable object 10 (the body portion 11 and the protruding portion 12) when the movable object 10 is being held.

Second Operation Example

Movable Object in an Upright State with Protruding at a Lower Position

Figure 6A:
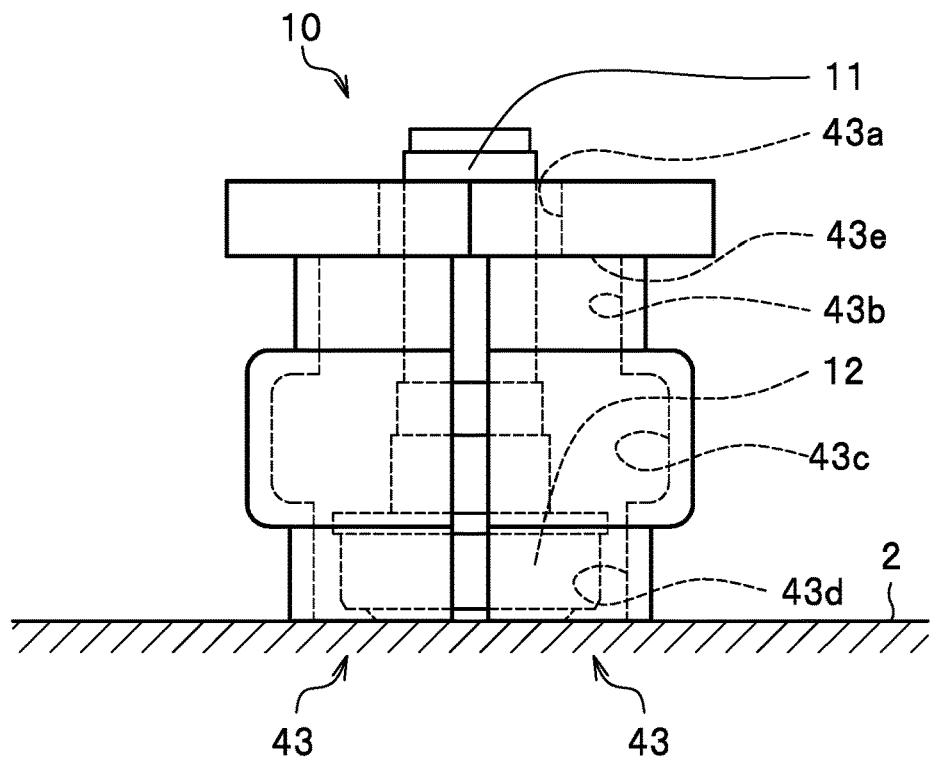
FIG. 6A illustrates schematically a second operation example of holding a movable object with the movable object holding system of the embodiment.

If the movable object 10 is placed on the movable object placing table 2, being in an upright state with the protruding portion 12 at a lower position, as shown in FIG. 6A, the control section 60 recognizes the state of the movable object 10 based on the image taken of the movable object 10 by the imaging section 50. Then, the control section 60 controls the pair of the revolving motors 45 to revolve 180 degrees the pair of the movable object holding parts 43 so that the pair of the movable object holding parts 43 are kept with the small diameter portions 43a positioned higher than the second medium diameter portions 43d and controls the joint motors 34 to move the hand part 40 over to such a position close to the movable object 10 that the pair of the movable object holding parts 43 is positioned respectively on both sides of the movable object 10 with the pair of the second medium diameter portions 43d kept more or less as low as the protruding portion 12 of the movable object 10.

Figure 6B:
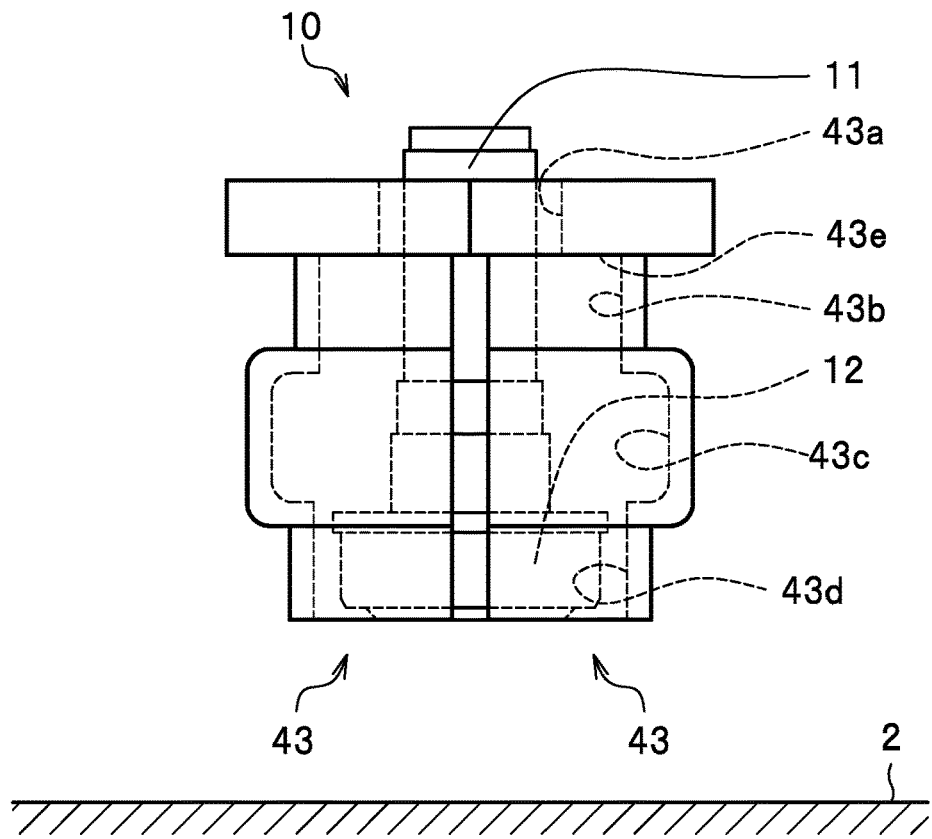
FIG. 6B illustrates schematically the second operation example of holding a movable object with the movable object holding system of the embodiment.

Then, the control section 60 controls the opening-closing motor 44 so that a pair of the finger parts 42 closes. In this case, the pair of the movable object holding parts 43 can hold the movable object 10 with the second medium diameter portion 43d touching the outer circumferential face of the protruding portion 12. Then, as shown in FIG. 6B, the control section 60 controls the joint motors 34 so that the movable object 10 being held is moved from the movable object placing table 2 over to a position over a hole portion 21 of the storage object 21.

Figure 7A:
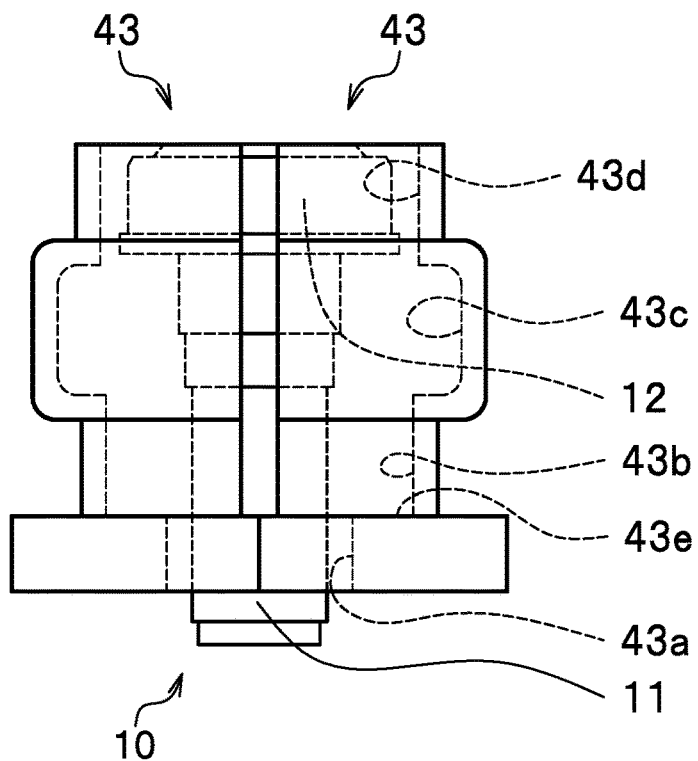
FIG. 7A illustrates schematically the second operation example of holding a movable object with the movable object holding system of the embodiment.
Figure 7B:
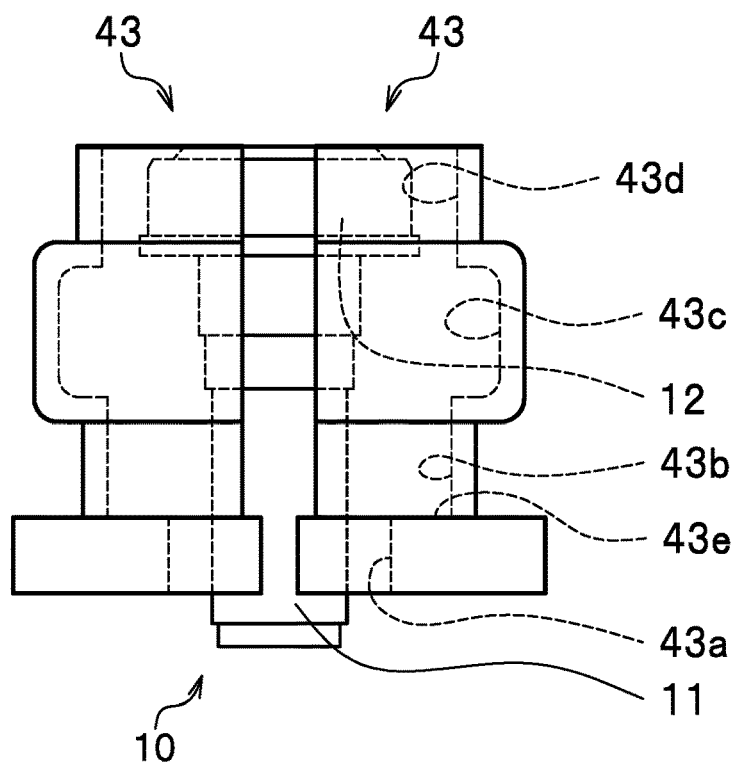
FIG. 7B illustrates schematically the second operation example of holding a movable object with the movable object holding system of the embodiment.

While the movable object 10 is being moved, the control section 60 controls the revolving motor 45 to revolve the pair of the movable object holding parts 43 by 180 degrees so that the pair of the movable object holding parts 43 becomes in a state in which the pair of the movable object holding parts 43 is kept with the small diameter portion 43a at a lower position as shown in FIG. 7A. Then, as shown in FIG. 7B, the control section 60 controls the opening-closing motor 44 so that a pair of the finger parts 42 slightly opens. As soon as a pair of the finger parts 42 opens, the movable object 10 falls down in a space surrounded by the pair of the movable object holding parts 43 to a position at which the protruding portion 12 touches and is supported by the pair of the positioning portions 43e. Then, the control section 60 controls the opening-closing motor 44 so that a pair of the finger parts 42 closes.

Then, the control section 60 controls the opening-closing motor 44 so that the pair of the finger parts 42 opens with a tip portion of the body portion 11 of the movable object 10 inserted in the hole portion 21. As a result, the body portion 11 of the movable object 10 is inserted into the hole portion 21 and the movable object 10 is stored on the storage object 2o with the protruding portion 12 touching the circumferential edge of the hole portion 21.

Third Operation Example

Figure 8A:
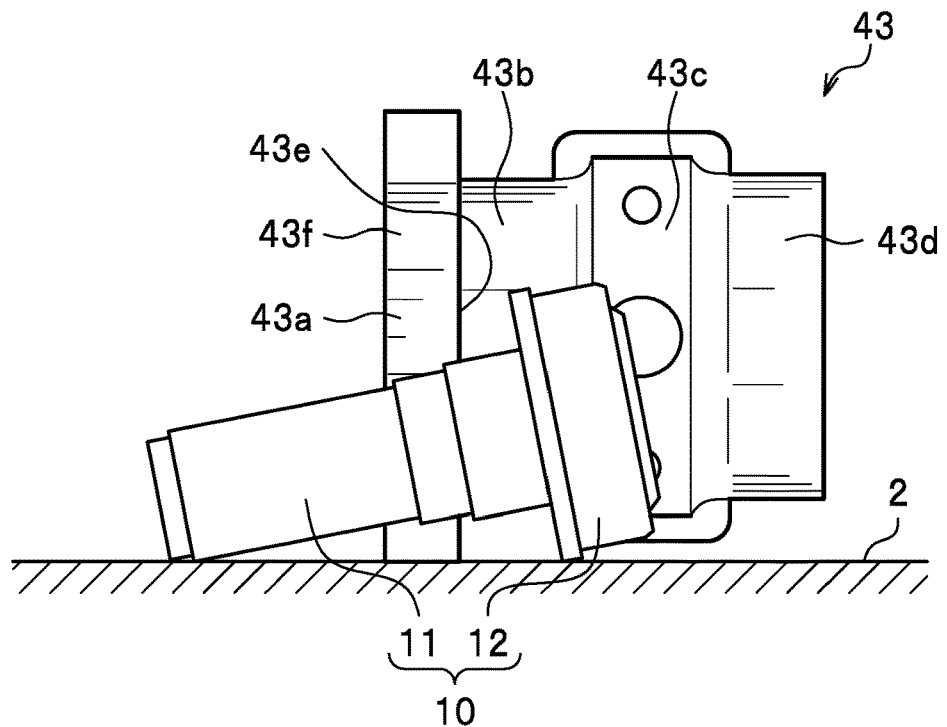
FIG. 8A illustrates schematically a third operation example of holding a movable object with the movable object holding system of the embodiment.

Movable Object in a Lying State with the Protruding Portion on a Surface of the Movable Object Placing Table If the movable object 10 is placed on the movable object placing table 2, being in a lying state with the protruding portion 12 on the surface of the movable object placing table 2 as shown in FIG. 8A, the control section 60 recognizes the state of the movable object 10 based on the image taken of the movable object 10 by the imaging section 50. Then, the control section 60 controls the pair of the revolving motor 45 to revolve the pair of the movable object holding parts 43 so that the pair of the movable object holding parts are kept with the second medium diameter portion 43d, the large diameter portion 43c, the first medium diameter portion 43b and the small diameter portion 43a are arranged horizontally, and controls the joint motors 34 to move the hand part 40 over to such a position close to the movable object 10 that the pair of the movable object holding parts is respectively on both sides of the movable object 10 with the pair of the small diameter portions 43a respectively on both sides of the body portion 11 and with the protruding portion 12 disposed between the other guide portions.

Figure 8B:
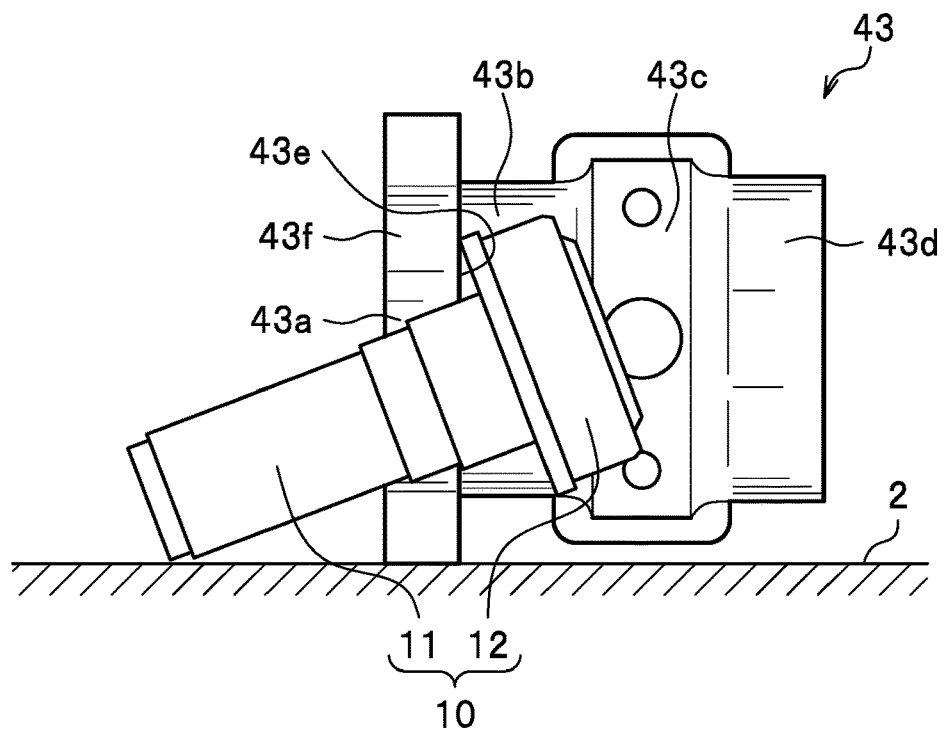
FIG. 8B illustrates schematically the third operation example of holding a movable object with the movable object holding system of the embodiment.
Figure 9A:
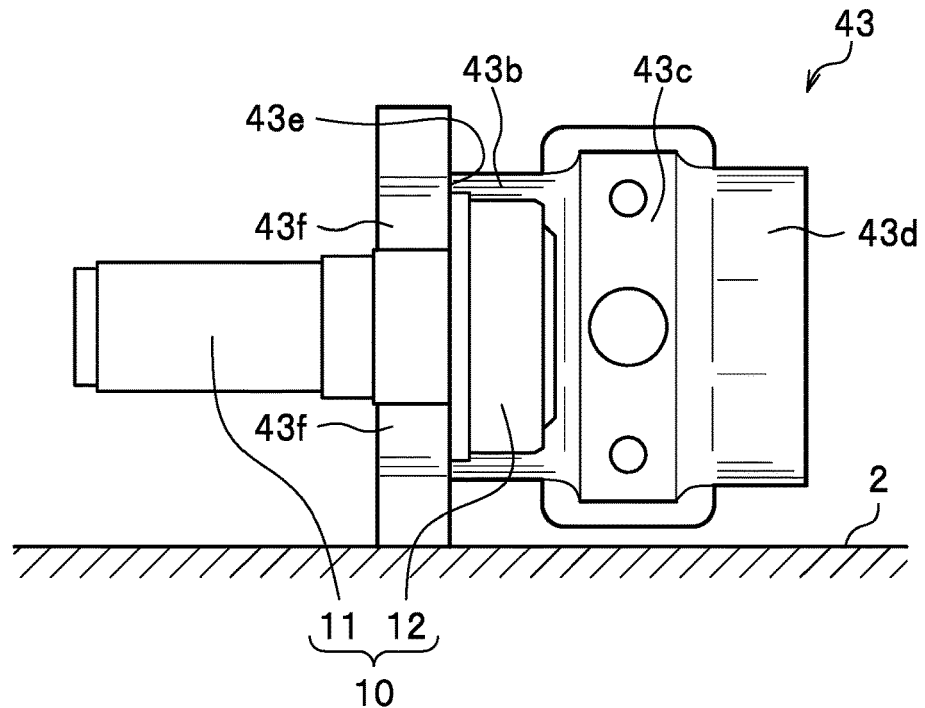
FIG. 9A illustrates schematically the third operation example of holding a movable object with the movable object holding system of the embodiment.

Then, as shown in FIG. 8B and FIG. 9A, the control section 60 controls the opening-closing motor 44 so that a pair of the finger parts closes. When this operation is performed, a pair of the guiding portions 43f formed on the lower side of the pair of the movable object holding parts 43 touches an outer circumferential face of the body portion 11 and comes under the body portion 11 to guide (scoop up) the body portion 11 into a space between a pair of the small diameter portion 43a.

Figure 9B:
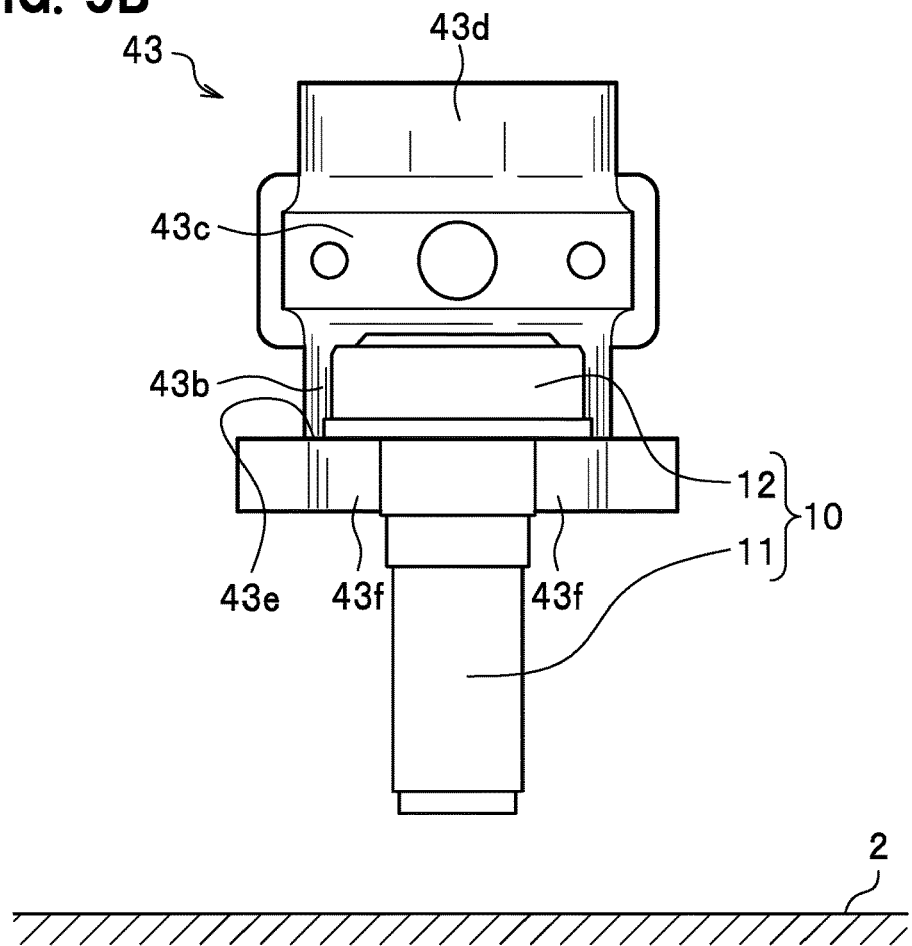
FIG. 9B illustrates schematically the third operation example of holding a movable object with the movable object holding system of the embodiment.

Then, as shown in FIG. 9B, the control section 60 controls the joint motors 34 so that the movable object 10 being held is moved from the movable object placing table 2 over to a position over a hole portion 21 of the storage plate 20. While the movable object 10 is being moved, the control section 60 controls the revolving motor 45 so that the pair of the movable object holding parts 43 is oriented upright with the small diameter portion 43a at a lower position. During this operation, the movable object 10 is held by the pair of the movable object holding parts 43 with the protruding portion 12 touching the pair of the positioning portions 43e.

Then, the control section 60 controls the opening-closing motor 44 so that a pair of the finger parts 42 opens with the tip portion of the body portion 11 of the movable object 10 being inserted in a hole portion 21. As a result, the movable object 10 is stored on the storage plate 20 with the body portion 11 inserted in the hole portion 21 and with the protruding portion 12 touching a circumferential edge portion of the hole portion 21.

Fourth Operation Example

Alignment of Movable Object with Gravity

Figure 10A:
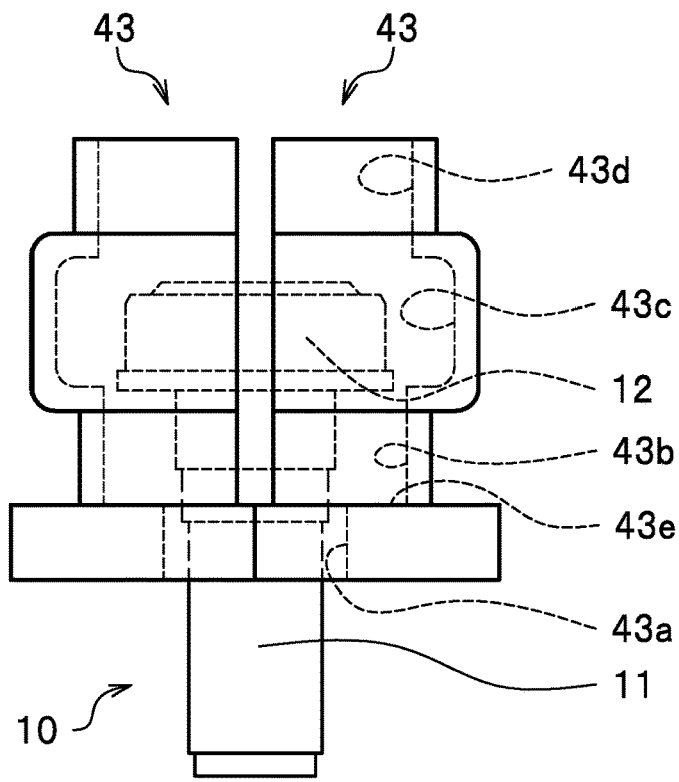
FIG. 10A illustrates schematically the third operation example of holding a movable object with the movable object holding system of the embodiment.
Figure 10B:
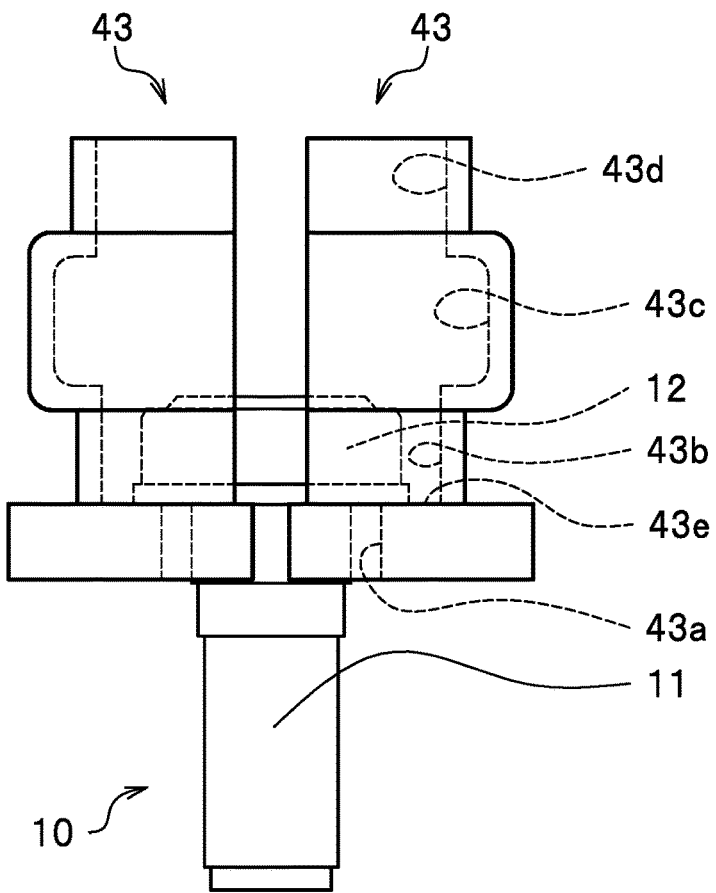
FIG. 10B illustrates schematically the third operation example of holding a movable object with the movable object holding system of the embodiment.
Figure 11:
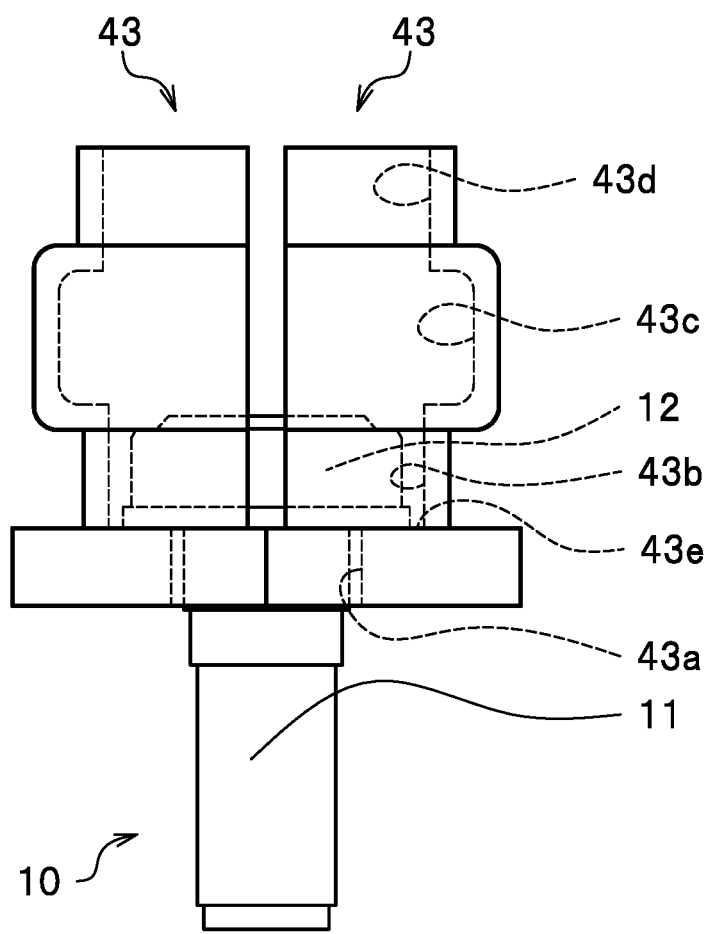
FIG. 11 shows schematically the third operation example of holding a movable object with the movable object holding system of the embodiment.

When an operation as described above is performed, there could a case in which the movable object 10 being held by the pair of the movable object holding parts 43 does not touch the pair of the positioning portions 43e for some reason, as shown in FIG. 10A. In this case, the control section 60 controls the opening-closing motor 44 so that a pair of the finger parts 42 slightly opens (operation for release from holding).

When this operation is performed, the movable object 10 falls and is held by the pair of the movable object holding parts 43 with the protruding portion 12 touching the pair of the positioning portions 43e. Then, the control section 60 controls the opening-closing motor 44 so that the pair of the finger parts 42 closes.

Fifth Operation Example

Alignment of Movable Object with External Force

The control section 60 can control the joint motors 34 and/or the revolving motor 45 so that a centrifugal force is applied to the movable object 10 that is held by the pair of the movable object holding parts 43 to have the protruding portion 12 touch the pair of the positioning portions 43e. In addition, the control section 60 can control the external force applying portion 46 so that an external force is applied to the movable object 10 held by the pair of the movable object holding parts 43 to have the protruding portion 12 touch the pair of the positioning portions 43e.

The control section 60 may perform the fourth operation example and/or the fifth operation example when it recognizes that the movable object 10 held by the pair of the movable object holding parts 43 does not touch the pair of the positioning portions 43e based on the image taken of the movable object 10 by the imaging section 50.

Alternatively, the control section 60 may perform the fourth operation example and/or the fifth operation example, regardless of whether the movable object 10 held by the pair of the movable object holding parts 43 touches the pair of the positioning portions 43e or not.

Sixth Operation Example

Action Based on Recognition of Movable Object

The control section 60 determines whether a movable object 10 includes a protruding portion 12, based on the image taken of the movable object 10 by the imaging section 50. If it is not possible to recognize the protruding portion 12 because there are plural movable objects 10 that randomly placed on the movable object placing table 2 with one over another, or, if the movable object 10 actually does not include the protruding portion 12, the control section 60 is configured to determine that the movable object 10 does not include the protruding portion 12 (with which to hold). In addition, the control section 60 may inform a user of the determination result with a display or a voice output.

Alternatively, the control section 60 may determine a diameter of a portion of the body portion 11 of the movable object 10 to be held by the small diameter portion 43a and determine a closing width by which a pair of the finger parts 42 to hold the movable object 10 closes.

Modified Example of Movable Object Holding Part

Figure 12:
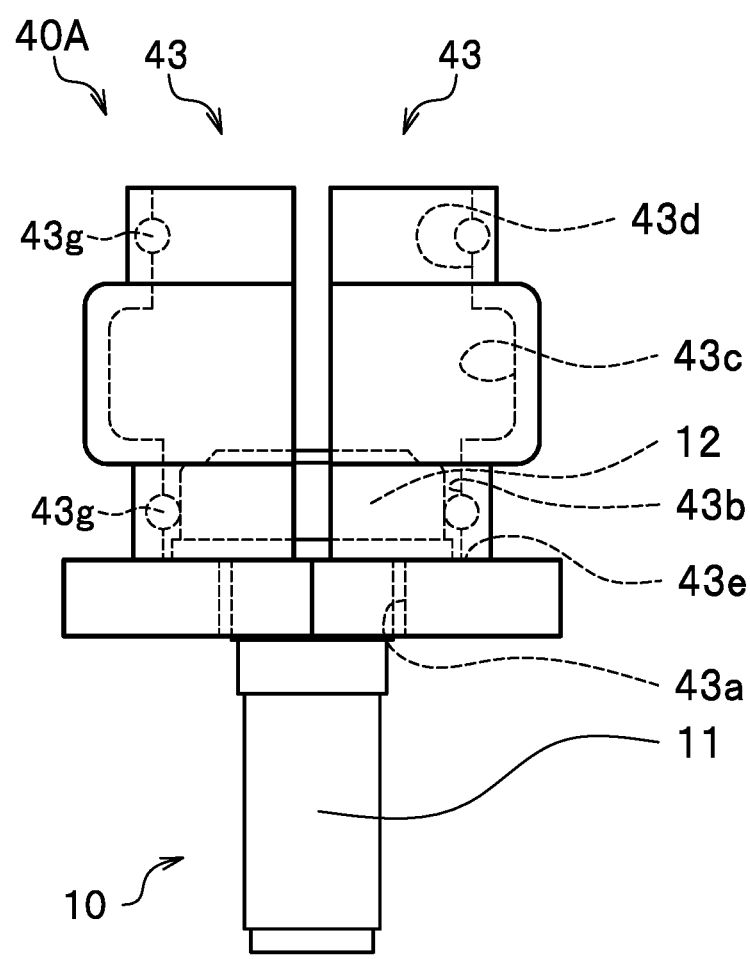
FIG. 12 shows schematically shows a front elevation view of a modified example of the movable object holding part.

As shown in FIG. 12, a movable object holding part 40A of a modified example may include plural bearing members 43g arranged on an inner circumferential face of each of the first medium diameter portion 43b and the second medium diameter portion 43d. Each of the bearing members 43g can rotate about any axis included in a plane including the axes $A_1$, $A_2$. When a movable object 10, to which such an external force as a gravity force is applied to be moved toward the pair of the positioning portions 43e, touches the bearing members 43g, the bearing members 43g are configured to rotate so that the movable object 10 is directed toward the pair of the positioning portions 43e.

The movable object holding system 1 of the embodiment of the present invention is configured to hold a movable object 10 including a body portion 11 and a protruding portion 12 protruding from the body portion 11. The hand part 40 to hold the movable object 10 includes plural guide portions (of a pair of the small diameter portion 43a, a pair of the first medium diameter portion 43b and a pair of the second medium diameter portion 43d) to limit movement of the movable object 10 in two axis directions (axes $A_1$, $A_2$) that are perpendicular to each other and a pair of the positioning portions 43e to limit movement of the movable object 10 in the other axis direction (axis $A_3$) that is perpendicular to the above mentioned two axis directions. The hand part 40 may hold the movable object 10 with the protruding portion 12 being kept in a space surrounded by the guide portions and touching the pair of the positioning portions 43e and with a part of the body portion 11 exposed out of the hand part 40.

As a result, the movable object holding system 1 can hold the movable object 10 in a predetermined position, though it has a relatively simple configuration.

The hand part 40 can put the movable object 10 it holds on the storage plate 21.

Accordingly, the movable object 1 can rather easily store movable objects 10 without performing a complicated position control operation on the hand part 40 and improve productivity.

A pair of guide portions (a pair of small diameter portions 43a) includes a pair of the guiding portions 43f that is meant to guide the movable object into a space between the pair of the guide portions when the hand part 40 holds the movable object 10.

As a result, the movable object holding system 1 can enlarge a tolerance for misalignment of the hand part 40 to the movable object 10 when the movable object 10 is held and hold the movable object 10 by the pair of the guiding portions 43f scooping up the movable object 10 in the lying state into a space between the pair of the guide portions.

The guide portions are arranged more or less in parallel with a longitudinal direction of the movable object 10, when the movable object 10 is being held.

As a result, the movable object holding system 1 can lower a friction resistance to the movable object when the body portion 11 or the protruding portion 12 touches any of the guide portions, and position control of the hand part 40 can be easily achieved, which contributes to productivity improving.

The pair of the positioning portions 43e extends in a direction perpendicular to the direction in which the guide portions are arranged.

As a result, when the guide portions are arranged in a vertical direction with the pair of the positioning portions 43e horizontally kept, the protruding portion 12 is reliably made to touch the pair of the positioning portions 43e.

The hand part 40 comprises the hand base part 41 and a pair of the movable object holding parts 43 including the guide portions and the pair of the positioning portions, the pair of the movable object holding parts 43 being attached to the hand base part 41 and capable of revolving about the hand base part 41.

As a result, having the pair of the movable object holding parts 43 revolve, the movable object holding system 1 can orient the pair of the movable object holding parts 43 in accordance with an orientation of the movable object 10 to be held and reliably make the protruding portion 12 touch the pair of the positioning portions 43e.

The movable object holding system 1 has the protruding portion 12 of the movable object 10 held by the hand part 40 touch the pair of the positioning portions 43e, making use of a gravity force or a centrifugal force generated by the pair of the movable object holding parts 43 revolving.

As a result, the movable object holding system 1 can reliably make the protruding portion 12 touch the pair of the positioning portions 43e.

The movable object holding system 1 may further include an external force applying part 46 that applies an external force so that the protruding portion 12 of the movable object 10 held by the hand part 40 touches the pair of the positioning portions 43e.

As a result, the movable object holding system 1 can reliably make the protruding portion 12 touch the pair of the positioning portions 43e.

The hand part 40 includes a plurality of the guide portions (small diameter portion 43a, first medium diameter portion 43b, second medium diameter portion 43d) that are arranged in a predetermined direction. When the movable object 10 is held in a space surrounded by the guide portions, a gap between inner circumferential faces of the guide portions is the smallest between the guide portions (small diameter portion 43a) that are located at a position from which the body portion 11 of the movable object 10 is exposed.

As a result, the movable object holding system 1 can keep the exposed portion of the body portion 11 stable and improve positioning accuracy of the movable object 10.

The guide portions are kept apart from the movable object 10, when the movable object 10 is held.

As a result, the movable object holding system 1 can prevent the body portion 11 and the protruding portion 12 from touching the guide portions and reliably make the protruding portion 12 touch the pair of the positioning portions 43e.

The guide portions may include bearing members 43g that can rotate when the movable object 10 touches them.

As a result, the movable object holding system 1 can reliably guide the movable object to the pair of the positioning portions 43e to reliably make the protruding portion 12 touch the pair of the positioning portions 43e due to the lower friction resistance.

The movable object holding system 1 may include the recognizing section (imaging section 50 and control section 60) to recognize the movable object 10, the hand part 40, and the arm part 30 that is connected to the hand part 40.

As a result, the movable object holding system 1 can control the arm part 30 and the hand part 40 based on a recognition result by the recognizing section, which enables reliably holding the movable object 10.

The movable object holding system 1 makes the protruding portion 12 of the movable object 10 held by the hand part 40 touch the pair of the positioning portions 43e using a centrifugal force generated by operation of the arm part 30.

As a result, the movable object holding system 1 can reliably make the protruding portion 12 touch the pair of the positioning portions 43e.

If the protruding portion 12 does not touch the pair of the positioning portions 43e when the movable object 10 is held, the hand part 40 can perform an operation to slightly release the movable object 10 being held to make the protruding portion 12 touch the pair of the positioning portions 43e.

As a result, the movable object holding system 1 can reliably make the protruding portion 12 touch the pair of the positioning portions 43e.

The recognizing section can determine whether the movable object 10 includes the protruding portion 12 or not. If the recognizing section determines that the movable object 10 includes the protruding portion 12, the hand part 40 holds the movable object 10 with the protruding portion 12 being kept in a space surrounded by the guide portions and touching the pair of the positioning portions 43e and with a part of the body portion 11 exposed out of the hand part 40.

As a result, the movable object holding system 1 can stop operation if it cannot hold the movable object 10.

The hand part 40 can change the position of the pair of the positioning portions 43e according to a shape of the movable object 10 recognized by the recognizing section and hold the movable object 10.

As a result, the movable object holding system 1 can reliably hold the movable object 10 if the diameter of the body portion 11 or the protruding portion 12 varies.

The embodiments of the present invention have been described. However, it should be noted that the scope of the present invention is not limited by the embodiment described above and that the present invention can be practiced with various other embodiments and modified examples that are within the scope of the present invention. For instance, the movable object 10 to be held may be any object including a body portion 11 and a protruding portion 12 protruding from a side of the body portion 11, such as a stopper in a L-character shape, a cap member, or a rod member having a portion to which a cylindrical member is joined.

In addition, there may be a plurality of the protruding portions 12 formed on a body portion 11 and arranged in the axis direction.

Furthermore, the number of the finger parts 42 is not limited to two and there may be more than two finger parts 42 included in the movable object holding system 1.

What is claimed:

1. A movable object holding system for holding a movable object including a body portion and a protruding portion protruding from the body portion, comprising a hand part holding the movable object, the hand part comprising:
   a hand base part and a pair of movable object holding parts, the pair of movable object holding parts having respective small diameter portions and respective first medium diameter portions, a gap between inner circumferential faces of the small diameter portions being smaller than a gap between inner circumferential faces of the first medium diameter portions,
   the respective small diameter portions and the respective first medium diameter portions forming plural guide portions limiting movement of the movable object in a first axis direction and a second axis direction that are perpendicular to each other; and
   the respective small diameter portions and the respective first medium diameter portions forming therebetween a pair of positioning portions limiting movement of the movable object in a third axis direction that is perpendicular to the first and second axis directions,
   wherein the hand part holds the movable object with the protruding portion of the movable object disposed in a space surrounded by the plural guide portions and touching the pair of the positioning portions and with a part of the body portion of the movable object exposed out of the hand part.

2. The movable object holding system as claimed in claim 1, wherein the hand part puts the movable object held by the hand part on a storage plate.

3. The movable object holding system as claimed in claim 1, wherein the plural guide portions include a pair of guiding portions that guides the protruding portion of the movable object into a space surrounded by the plural guide portions when the hand part is holding the movable object.

4. The movable object holding system as claimed in claim 1, wherein the plural guide portions are arranged in the third axis direction to be oriented substantially in parallel with a longitudinal direction of the movable object when the movable object is being held.

5. The movable object holding system as claimed in claim 4, wherein the pair of the positioning portions extends perpendicularly to the third axis direction.

6. The movable object holding system as claimed in claim 4, wherein a gap formed between inner circumferential faces of the plural guide portions when the movable object is being held is the smallest between a pair of the guide portions that are located at a position from which the body portion of the movable object is exposed.

7. The movable object holding system as claimed in claim 1, wherein the hand part comprises a hand base part and a movable object holding part including the plural guide portions and the pair of the positioning portions, wherein the movable object holding part is attached to the hand base part in such a way that the movable object holding part is capable of revolving.

8. The movable object holding system as claimed in claim 7, wherein the movable object is made to touch the pair of the positioning portions by a gravity force or by applying to the movable object a centrifugal force generated by revolving the movable object holding part.

9. The movable object holding system as claimed in claim 1, wherein the hand part further comprising an external force applying part to apply an external force to the protruding portion of the movable object being held by the hand part so that the protruding portion touches the pair of the positioning portions.

10. The movable object holding system as claimed in claim 1, wherein the movable object that is being held is kept apart from the plural guide portions.

11. The movable object holding system as claimed in claim 1, wherein the plural guide portions include bearing members that are capable of rotating when the movable object touches the bearing members.

12. The movable object holding system as claimed in claim 1, further comprising a recognizing section recognizing the movable object and an arm part connected with the hand part.

13. The movable object holding system as claimed in claim 12, wherein the protruding portion of the movable object that is being held by the hand part is made to touch the pair of the positioning portions by applying a centrifugal force generated by an operation of the arm part.

14. The movable object holding system as claimed in claim 12, wherein if the protruding portion of the movable object that is being held does not touch the pair of the positioning portions, the hand part performs an operation to slightly release the movable object being held to make the protruding portions touch the pair of the positioning portions.

15. The movable object holding system as claimed in claim 12, wherein the recognizing section determines whether the movable object includes the protruding portion or not, and wherein if the recognizing section determines that the movable object includes the protruding portion, the hand part holds the movable object with the protruding portion being kept in the space surrounded by the guide portions and touching the pair of the positioning portions and with a part of the body portion exposed out of the hand part.

16. The movable object holding system as claimed in claim 12, wherein the hand part changes the position of the pair of the positioning portions according to a shape of the movable object recognized by the recognizing section to hold the movable object.

17. The movable object holding system as claimed in claim 1, wherein the pair of movable object holding parts further include respective large diameter portions and respective second medium diameter portions, the gap between inner circumferential faces of the small diameter portions being smaller than gaps between inner circumferential faces of the large diameter portions and between inner circumferential faces of the second medium diameter portions, the gap between the inner circumferential faces of the respective large diameter portions being larger than the gaps between inner circumferential faces of the small diameter portions, between the inner circumferential faces of the first medium diameter portions, and between the inner circumferential faces of the second medium diameter portions, the respective large diameter portions being disposed between the respective first medium diameter portions and the second medium diameter portions in the third axis direction, and the respective first medium diameter portions being disposed between the respective small diameter portions and the respective large diameter portions in the third axis direction.

\* \* \* \* \*